Figure 1:
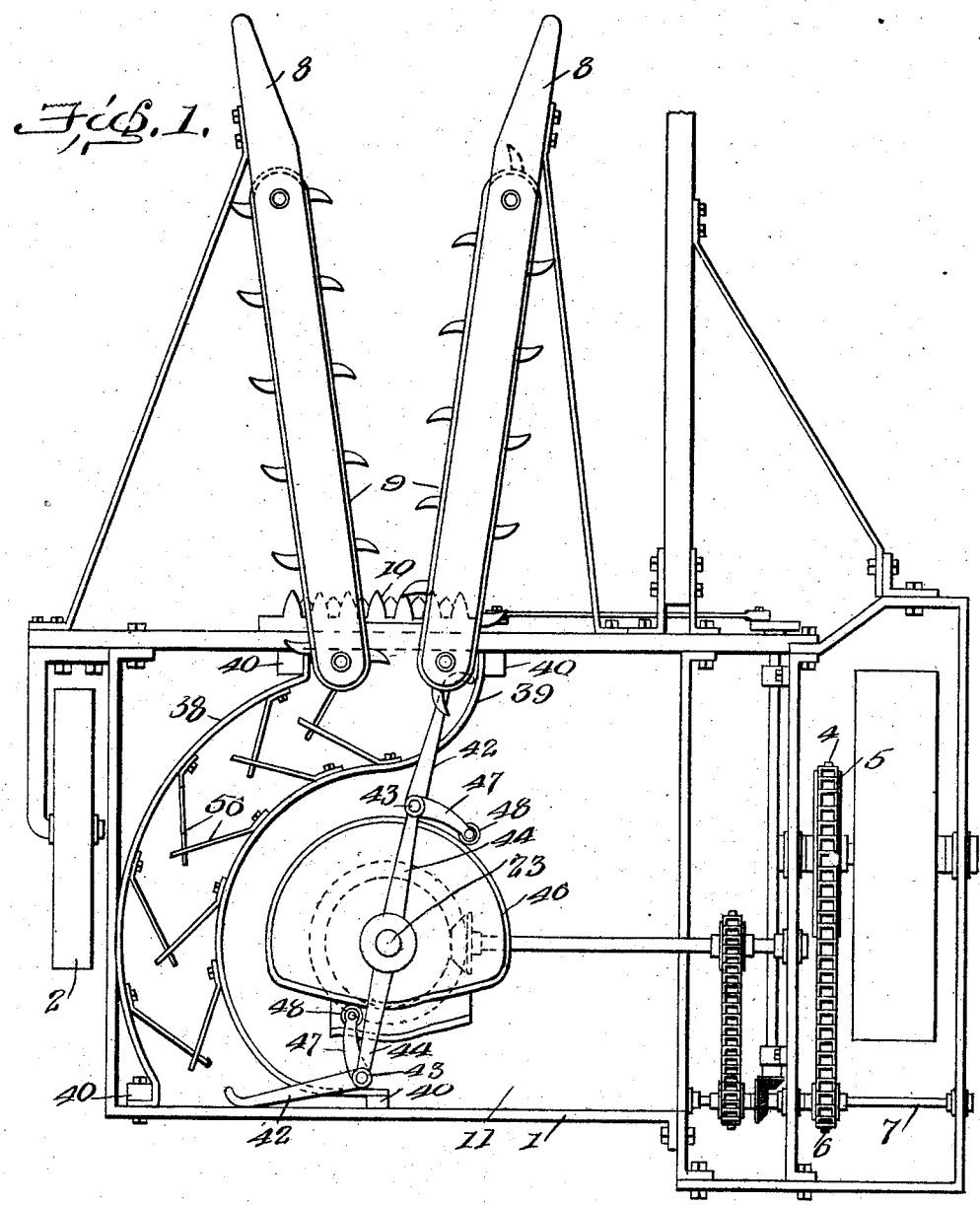

No. 851,060. PATENTED APR. 23, 1907.
H. BROOME.
CORN HARVESTER.
APPLICATION FILED JULY 27, 1906.

2 SHEETS—SHEET 1.

Witnesses
G. Howard Walmsley,
Edward Z. Reed

Inventor
Henry Broome,
By H. A. Toulmin,
Attorney

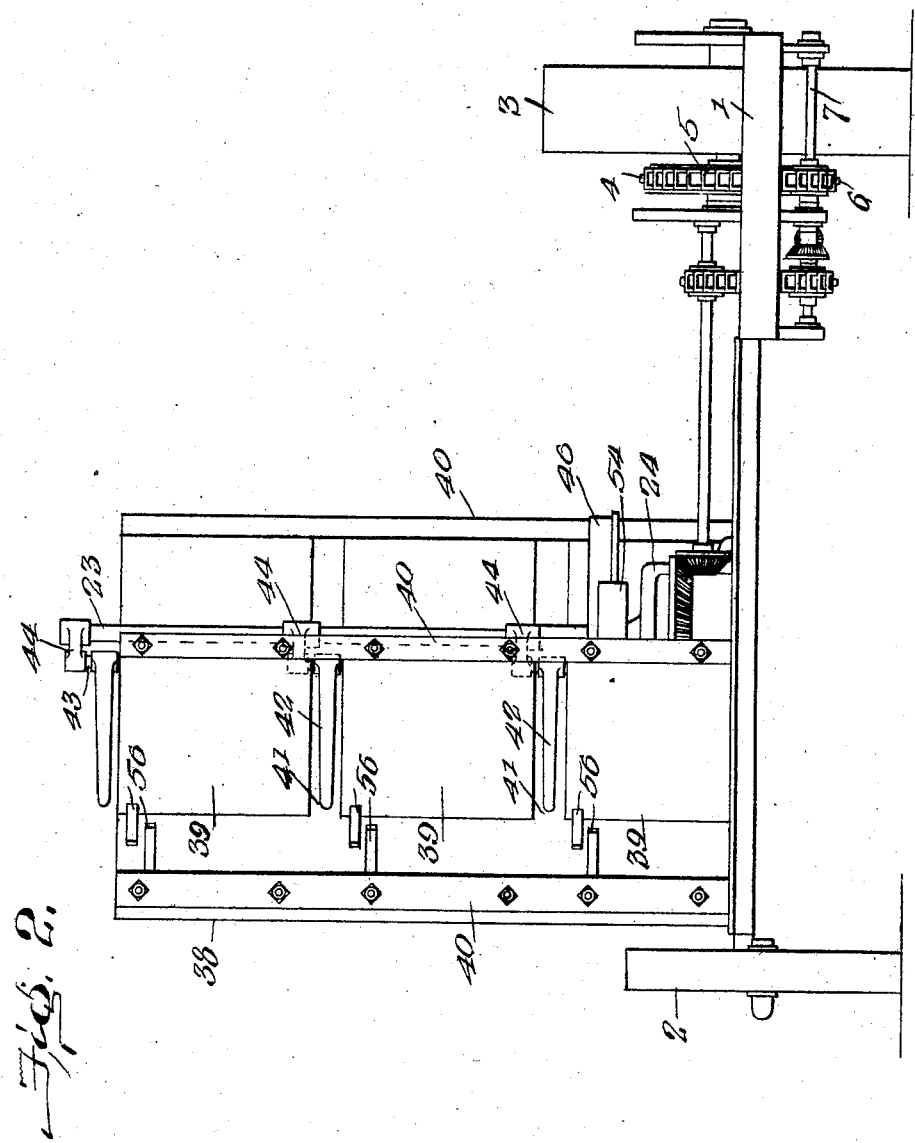

UNITED STATES PATENT OFFICE.

HENRY BROOME, OF SPRINGFIELD, OHIO, ASSIGNOR OF ONE-THIRD TO WILLIAM DENNICK, OF DAYTON, OHIO, AND ONE-THIRD TO CLAUDE W. FLICK, OF SPRINGFIELD, OHIO.

CORN-HARVESTER.

No. 851,060.     Specification of Letters Patent.     Patented April 23, 1907.

Original application filed May 14, 1906, Serial No. 316,644. Divided and this application filed July 27, 1906. Serial No. 327,988.

*To all whom it may concern:*

Be it known that I, HENRY BROOME, a citizen of the United States, residing at Springfield, in the county of Clark and State of Ohio, have invented certain new and useful Improvements in Corn-Harvesters, of which the following is a specification, reference being had therein to the accompanying drawings.

My invention relates to corn-harvesters, and more particularly to that class of corn-harvesters employing guideways for conveying the stalks of corn in a vertical position from the cutting mechanism to a suitable receptacle or platform at the rear of the machine; and the object of my invention is to provide such a guideway with means whereby the stalks will be maintained in an upright position and so situated that any of the stalks which may be out of position will be straightened by the contact of the reel-arms with the same.

With this object in view, my invention consists of the construction hereinafter described, and more particularly pointed out in the claims.

In the drawings, Figure 1 is a plan view of the machine embodying my invention in one form, and Fig. 2 is a rear elevation of the same.

The present application is a division of the application filed by me May 14, 1906, Serial No. 316,644, and the invention forming the subject-matter thereof may be applied to corn-harvesters of any suitable construction; but for purposes of illustration I have shown in the drawings a corn-harvester comprising a main frame 1, supported on ground-wheels 2 and 3, the wheel 3 being the drive-wheel and being provided with a sprocket 4 and a sprocket-chain 5, engaging the sprocket 6 on the drive-shaft 7. The frame 1 is provided at its forward end with gathering-in arms 8, having a gathering-in conveyer 9 of any suitable construction, and secured to the frame of the machine near the rear end of these arms is the cutting mechanism. Both the gathering-in mechanism and the cutting mechanism, as well as the frame of the machine and driving-gear, form no part of the present invention and are not shown herein in detail.

Upon the deck or floor 11 of the main frame I provide mechanism for conveying in an upright position the severed stalks delivered by the gathering-in conveyer at the front of the machine, said mechanism carrying the stalks to the rear of the machine and then delivering them to a suitable platform or receptacle.

The conveying mechanism comprises two curved upright guides 38 and 39, rising from the platform 11, their front ends extending forward to and embracing the rear ends of the gathering-conveyers 15. These guides are supported by uprights or posts 40 at their front and rear ends, and the inner guide 39 is slotted horizontally, as at 41, to permit of the passage of the reel-arms. These reel-arms may be of any suitable construction; but I prefer that shown in the drawings, wherein I illustrate a reel mechanism comprising a vertical shaft having secured thereto radial arms 23 carrying rock-shafts 43, upon which are pivoted reel-arms 42. These rock-shafts also carry arms 47, provided with rollers 48, adapted to engage the outer surface of a fixed cam 46, thereby guiding the reel-arms 42 in their movement through the guideway. The construction of this reel forms no part of the present invention, but does form the subject-matter of a separate application. I also make provision for holding the severed stalks in upright position in the guideway or chute between the guides 38 and 39, the devices employed straightening up the stalks in case they are delivered from the gathering-conveyers in an inclined position and also serving to prevent their toppling over in the direction in which they are moved by the reel-arms. For this purpose I employ yielding or resilient supporting-fingers 56, secured to the guides 38 and 39 and extending horizontally in an inclined direction so as to converge and overlap in the direction in which the stalks are moved. These fingers are preferably arranged in pairs immediately below the path of each reel-arm, as indicated in Fig. 2, one of the fingers of each pair being arranged below the other finger of said pair, as shown. The foremost set of these resilient fingers will serve to straighten up any stalks which may be delivered in an inclined position from the gathering-conveyers, since whichever end, tip or butt, is traveling in advance of the other end will first come into contact with either the upper or lower pair of fingers and will be arrested thereby until the reel-arms come into contact with the opposite end of the stalk and bring it into vertical position with respect to the remainder. These fingers of course yield to permit the passage of the stalks under the pressure exerted on them by the reel-arms; but it will be seen that they serve to prevent the stalks from toppling over in the direction of their travel when struck by the reel-arms, and thus, in conjunction with the guides and reel-arms, serve to maintain the stalks in upright position throughout their travel from the front to the rear of the machine. The cam 46 is so shaped that the reel-arms are maintained in a position radial with respect to the reel-shaft 23 from the time they sweep across the front end of the guideway formed between the guides 38 and 39 until they approach the rear end of said guideway. At this point the reel-arms are caused by the cam to maintain a position substantially parallel with the transverse axis of the machine, or, in other words, the rear or discharge edge of the platform 11. By reason of this mode of operation the reel-arms during the latter portion of their effective stroke act to push the stalks directly to the rear and do not tend to move them laterally with respect to the machine. At the same time the reel-arms withdraw gradually through the slots in the inner guide 39, being moved inwardly so as to clear the rear supporting standard or post 40 of said guide in the manner indicated in Fig. 1 of the drawings.

Having thus fully described my invention, what I claim as new, and desire to secure by Letters Patent, is—

1. In a corn-harvester of the character described, the combination, with a main frame provided with cutting and gathering mechanism, of upright guides to receive the severed stalks, said guides being provided with rearwardly-converging resilient fingers to receive and straighten up the stalks, said fingers overlapping at a point substantially midway between said guides, substantially as described.

2. In a corn-harvester of the character described, the combination, with a main frame provided with cutting mechanism, of upright guides to receive the severed stalks, said guides being provided with rearwardly-converging resilient fingers to receive and straighten up the stalks, said fingers being arranged in pairs, the inner ends of the fingers of the several pairs overlapping at a point substantially midway between said guides, substantially as described.

3. In a corn-harvester of the character described, upright guides forming a guideway along which the stalks are carried in upright position, said guides being provided with a series of resilient rearwardly-converging fingers arranged in substantially parallel vertical planes on the opposite sides of said guideway, substantially as described.

4. In a corn-harvester of the character described, upright guides forming a guideway along which the stalks are carried in upright position, one of said guides having longitudinal slots formed therein dividing the same into sections, a series of rearwardly-converging resilient fingers on each of said sections and corresponding fingers on the opposite guide having their ends extending beyond the ends of the first-mentioned fingers, substantially as described.

In testimony whereof I affix my signature in presence of two witnesses.

HENRY BROOME.

Witnesses:
E. O. HAGAN,
EDWARD L. REED.